United States Patent
Piazzalunga

(10) Patent No.: US 6,177,777 B1
(45) Date of Patent: Jan. 23, 2001

(54) ACTUATION AND CONTROL METHOD AND DEVICE, PARTICULARLY FOR SYNCHRONOUS PERMANENT-MAGNET MOTORS

(75) Inventor: Giovanni Piazzalunga, Petosino (IT)

(73) Assignees: SICCE S.p.A., San Pietro In Gu'; Tait S.r.l., Alme', both of (IT)

( * ) Notice: Under 35 U.S.C. 154(b), the term of this patent shall be extended for 0 days.

(21) Appl. No.: 09/230,744

(22) PCT Filed: Jul. 30, 1997

(86) PCT No.: PCT/EP97/04149

§ 371 Date: Feb. 1, 1999

§ 102(e) Date: Feb. 1, 1999

(87) PCT Pub. No.: WO98/06167

PCT Pub. Date: Feb. 12, 1998

(30) Foreign Application Priority Data

Aug. 5, 1996 (IT) ............................................. BO96A0429

(51) Int. Cl.⁷ ............................... H02P 1/46; H02P 3/18; H02P 5/28; H02P 7/36
(52) U.S. Cl. ......................... 318/700; 318/707; 318/711; 318/476; 318/566
(58) Field of Search ..................................... 318/700, 705, 318/706, 707, 710, 711, 476, 566

(56) References Cited

U.S. PATENT DOCUMENTS

| | | | | |
|---|---|---|---|---|
| 3,903,463 | * | 9/1975 | Kanamori | 318/138 |
| 4,347,464 | * | 8/1982 | Park et al. | 318/254 |
| 4,661,756 | * | 4/1987 | Murphy et al. | 318/701 |
| 5,315,225 | * | 5/1994 | Heinrich et al. | 318/712 |
| 5,373,223 | * | 12/1994 | Akagi et al. | 318/722 |
| 5,569,994 | * | 10/1996 | Taylor et al. | 318/700 |
| 5,675,226 | * | 10/1997 | Riola' | 318/439 |
| 5,701,065 | * | 12/1997 | Ishizaki | 318/701 |

FOREIGN PATENT DOCUMENTS

| | | |
|---|---|---|
| 0574823 | 12/1993 | (EP) . |
| 0666639 | 8/1995 | (EP) . |
| 0682404 | 11/1995 | (EP) . |

* cited by examiner

Primary Examiner—Robert E. Nappi
Assistant Examiner—Edgardo San Martin
(74) Attorney, Agent, or Firm—Guido Modiano; Albert Josif; Daniel O'Byrne

(57) ABSTRACT

The method and the corresponding device allow to start a synchronous motor with the chosen rotation direction, with a very high static torque, without requiring any modification of the structure of the synchronous motors currently in use, by means of an adapted electronic circuit managed by a microprocessor.

7 Claims, 5 Drawing Sheets

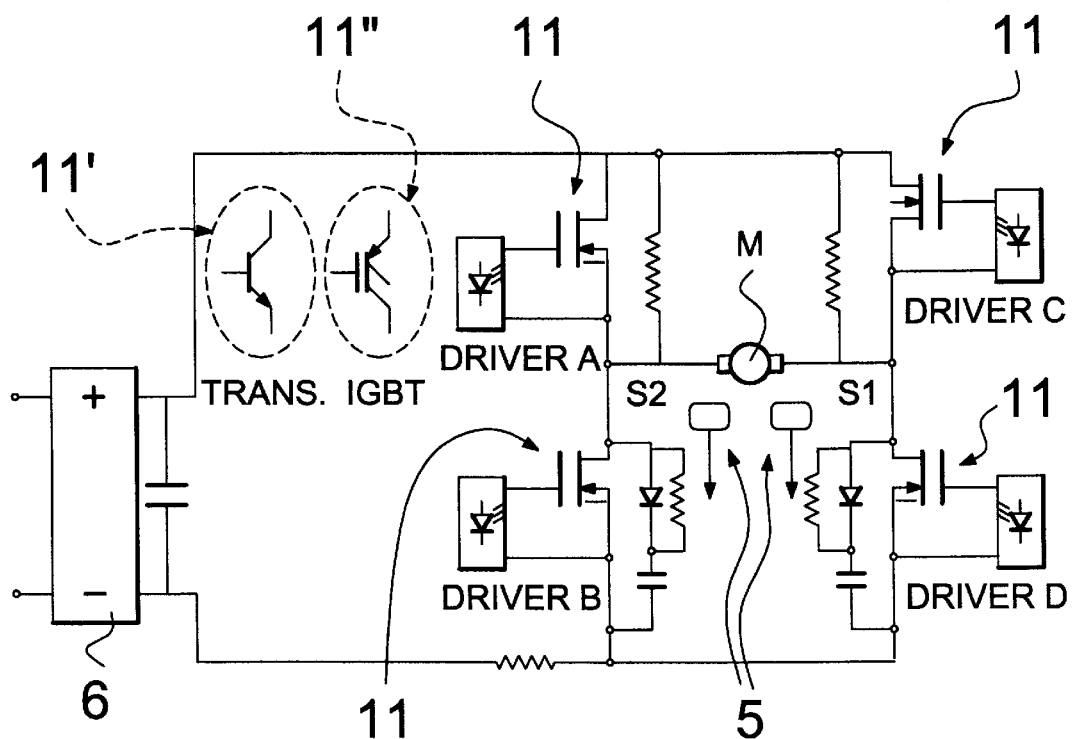
FIG. 6
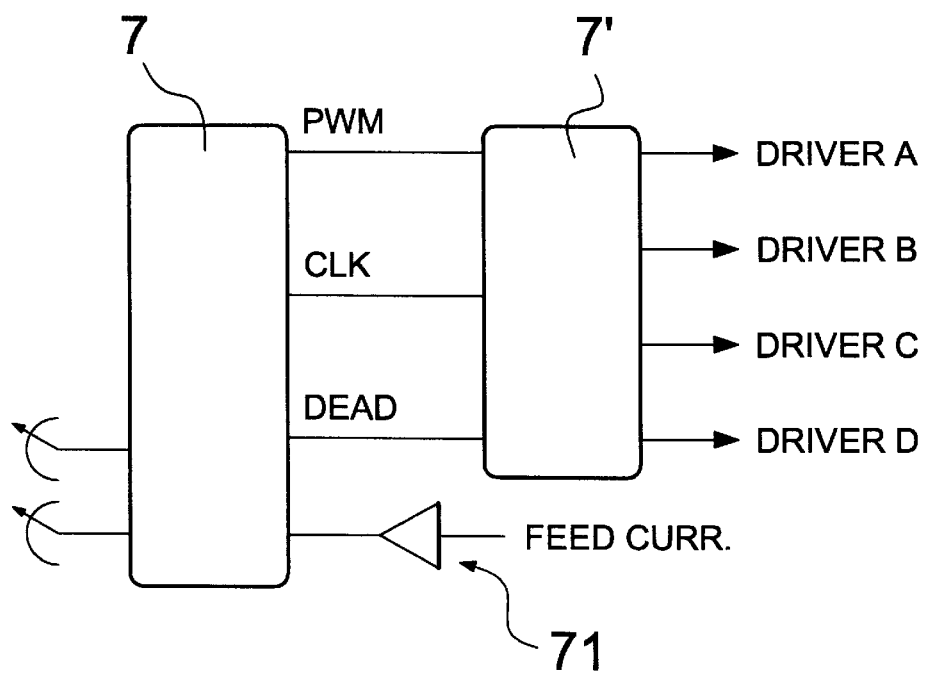

ACTUATION AND CONTROL METHOD AND DEVICE, PARTICULARLY FOR SYNCHRONOUS PERMANENT-MAGNET MOTORS

TECHNICAL FIELD

The present invention relates to an actuation and control method and to the corresponding device, particularly for permanent-magnet synchronous motors.

BACKGROUND ART

Synchronous motors are AC motors which rotate at a fixed rate, known as synchronous rate, which depends on the frequency of the supply voltage and on the number of poles of the motor.

Synchronous motors are generally substantially constituted by a rotor, having a ring of magnetic poles excited with direct current (inductor), and by a stator, constituted by a laminated magnetic core; the armature winding is located in the internal peripheral region of said core, within grooves formed therein, and is connected to the AC supply line by means of terminals.

In the particular case of permanent-magnet motors, the inductor is constituted by a permanent magnet, generally made of alnico or magnetized ferrite, instead of by poles excited with DC current.

Small permanent-magnet synchronous motors are currently in widespread use owing to their simplicity and low cost and are usually used for low power levels.

The synchronous motor, however, entails some drawbacks. First of all, it is not possible to predict the starting rotation direction; moreover, the static torque offered is substantially weak, making startup sometimes difficult even in the presence of relatively small loads.

Various devices have been devised in order to obviate this drawback, but they are particularly complicated and expensive and therefore cannot be used conveniently in motors which must have a modest cost, such as for example those designed for pumps or similar devices.

In many cases, the use of these systems entails structural modifications to the motor, making their use impossible in normal mass-production.

DISCLOSURE OF THE INVENTION

A principal aim of the present invention is to allow the startup of a synchronous motor so as to select the preferred rotation direction and provide a high static torque. These characteristics can be achieved by means of an electronic device which is particularly simple and economical and uses an appropriately programmed microcontroller. This solution allows to minimize the use of discrete external components, to the full advantage of circuit simplicity, reliability, and costs.

The following characteristics are among the advantages of the present invention and are listed by way of non-limitative example.

With the method and corresponding device according to the present invention it is possible to vary the rotation rate of a synchronous motor through a frequency variation, gradually passing from the motor rotation rate to a preset rotation rate. This is achieved by means of a ramp time which is calibrated (according to the characteristics of the motor) so as to maintain synchronism.

It is possible to correct the induction on the stator by means of a curve which is preset in the EPROM of the microcontroller (also referenced to as $\mu$controller hereinafter).

It is possible to implement various curves, which are selected automatically by the microcontroller by means of dedicated software, according to the operating conditions of the motor, for example as a function of the load, of the time required to reach a certain rotation rate, and other parameters.

In other words, the $\mu$controller contains software which contains the information required to define the curve which is most adapted to the operating conditions of the motor.

The stator current is controlled in order to correct the induction curve and to protect the permanent magnet.

There is provided a launching procedure and a presetting operation by using DC current which is modulated so as to avoid demagnetizing the rotor magnet.

The rotation direction and the position of the motor are also controlled by means of sensors.

BRIEF DESCRIPTION OF THE DRAWINGS

The characteristics of the present invention, according to the above aim and objects, can be clearly determined from the content of the appended claims, and its advantages will become apparent from the following detailed description, given with reference to the accompanying drawings, which illustrate a purely exemplifying and non-limitative embodiment thereof, wherein:

FIGS. 6 and 7 are respectively a view of a further circuit diagram related to the device according to the present invention and a diagram related to possible waveforms which can be used to control and drive the motor.

WAYS OF CARRYING OUT THE INVENTION

Figure 1:
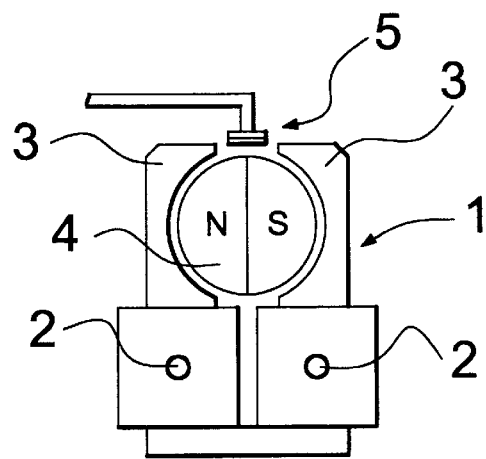
FIG. 1 is a schematic embodiment of a permanent-magnet synchronous motor.

FIG. 1 schematically illustrates a synchronous motor generally designated by the reference numeral 1. The motor 1 comprises a permanent-magnet rotor 4 arranged between the poles 3, whereon corresponding exciter windings 2 act. In order to perform measurements on the rotor 4, at least one position sensor 5 is provided, for example of the Hall-effect type. It is of course possible to provide a plurality of sensors (for example two such as those designated by S1 and S2 in FIG. 6) and said sensors can be of another kind, provided they are adapted to detect the position-motion of the motor.

Figure 2:
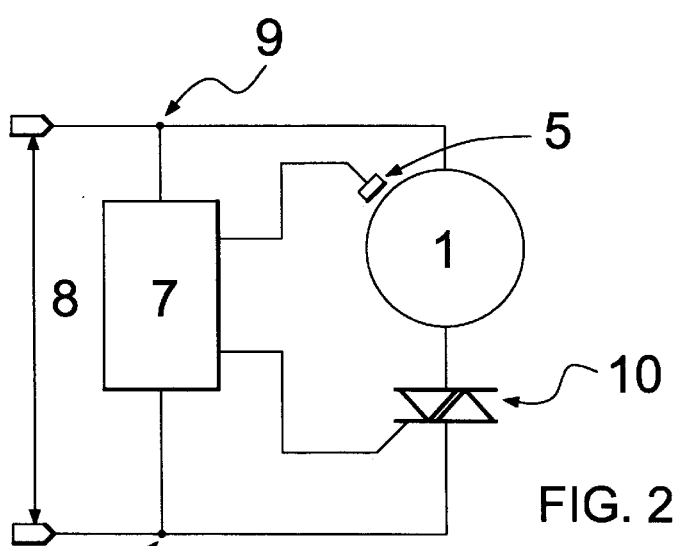
FIGS. 2 and 3 are views of possible circuit diagrams related to devices for the actuation and control of synchronous motors according to the present invention.
Figure 3:
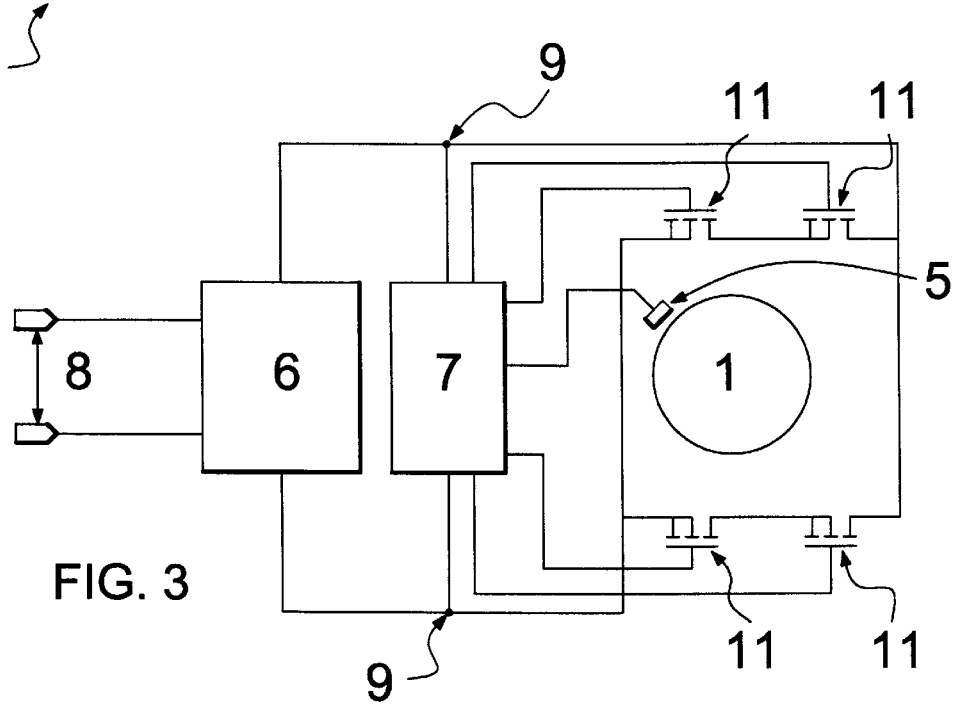

One of the possible embodiments of the invention provides, as shown in FIG. 2, for the use of a circuit based on a microprocessor 7 (also referenced to as microcontroller or $\mu$controller 7 in the present description), which is electrically connected to the power supply circuit 8 of the motor, as shown in FIG. 3 at corresponding connecting points 9 and downstream of a power supply 6.

In the illustrated example, the microprocessor circuit 7 is connected to the Hall-effect position sensor 5 and to a TRIAC component 10 which is arranged, for example, in series to the stator windings. The microcontroller 7 can have, or be connected to, a switch (not illustrated in the figures) so as to preset the intended rotation direction.

In the example of FIG. 3, a plurality of components 11 of the MOSFET type is provided as an alternative to the TRIAC device.

The method for actuating and controlling the synchronous motor can be divided schematically into a launching procedure and into a torque control procedure.

Figure 4:
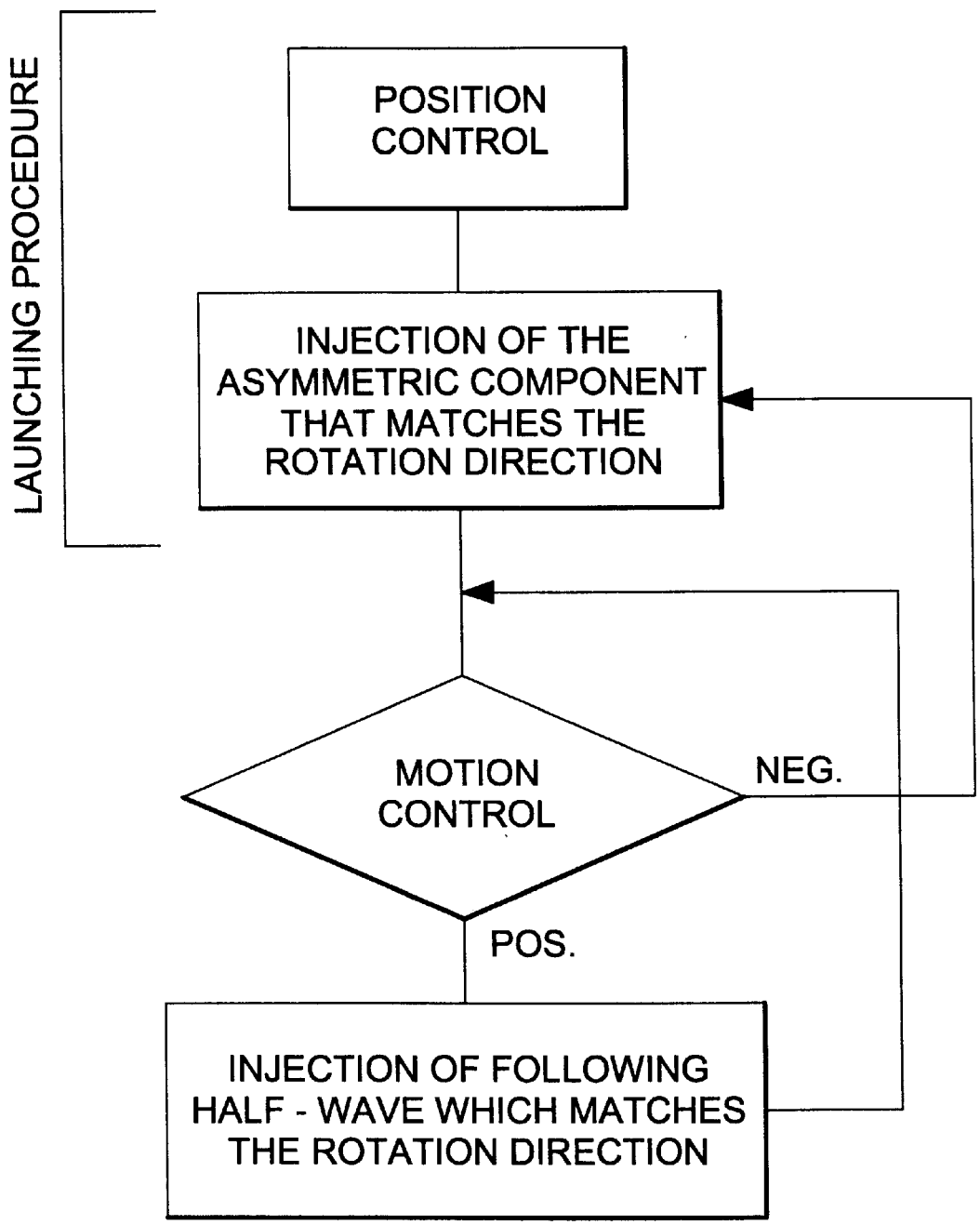
FIGS. 4 and 5 are views of possible flowcharts related to methods for the actuation and control of electric motors according to the present invention.

The launching procedure, described schematically by the flowchart of FIG. 4, particularly in the first part of said flowchart, can also be used as a procedure which is independent of subsequent procedures, i.e., only to start the motor in the chosen rotation direction. In this procedure, the stator is powered by means of a 50-Hz AC voltage characterized by a DC component, the effective voltage whereof causes the rotor to be positioned in the chosen direction. The polarity of the DC component depends on the chosen rotation direction. The position sensor 5 is capable of reporting to the microcontroller 7 that the rotor 4 has aligned, so as to promptly apply the symmetrical in-phase 50-Hz AC voltage, thus starting rotation in the chosen direction.

Once the startup procedure has ended, it is possible to act so as to improve the intrinsically weak torque of the synchronous motor. The above-described position sensor 5 measures, at every 180° of rotation, the phase shift of the rotor, which is accelerating towards the synchronous rotation rate, with respect to the mains frequency.

Proportionally to said phase shift, the microcontroller 7 sends to the stator a plurality of asymmetric waves having a DC component of the appropriate polarity (reference should be made to FIG. 3). In this manner, a very high static torque is obtained which is comprised between 1.5 and 2 times the nominal synchronous torque.

With particular reference to FIG. 4, the method can therefore include a first step wherein position control is performed and the asymmetric component corresponding to the chosen rotation direction is injected. Then, on the basis of a motion control, as illustrated by the decision symbol of FIG. 4, the half-wave corresponding to the rotation direction is injected or, as an alternative, the asymmetrical component corresponding to the rotation direction is injected again.

For particular applications requiring even higher starting torques, it is possible to use, instead of the TRIAC 11, a solid-state switch characterized by the possibility of perfectly defining the polarity of the applied wave trains, so as to reach values which are 10 times the nominal synchronous torque. By means of this last configuration, instead of working with the mains AC voltage, but by modulating a DC voltage (as provided in the diagram of FIG. 5), the microcontroller 7 is also capable of varying the synchronous rate on command, generating an AC voltage of appropriate frequency. The modulation of the DC voltage is accomplished by means of single-pole solid-state switches. In this manner it becomes possible to adjust the torque and rotation rate values of any synchronous motor by varying them within the mechanical limits of said motor, even in the presence of a variable load.

During the launching procedure and during rotation at non-synchronous rates, the current absorbed by the stator is 1.5÷2 times the nominal current. Accordingly, in case of jamming or prolonged operation at non-synchronous rates, the motor is controlled intermittently by the microcontroller, with a duty cycle having a preset value so as to avoid taking the stator winding beyond its temperature rating.

Figure 5:
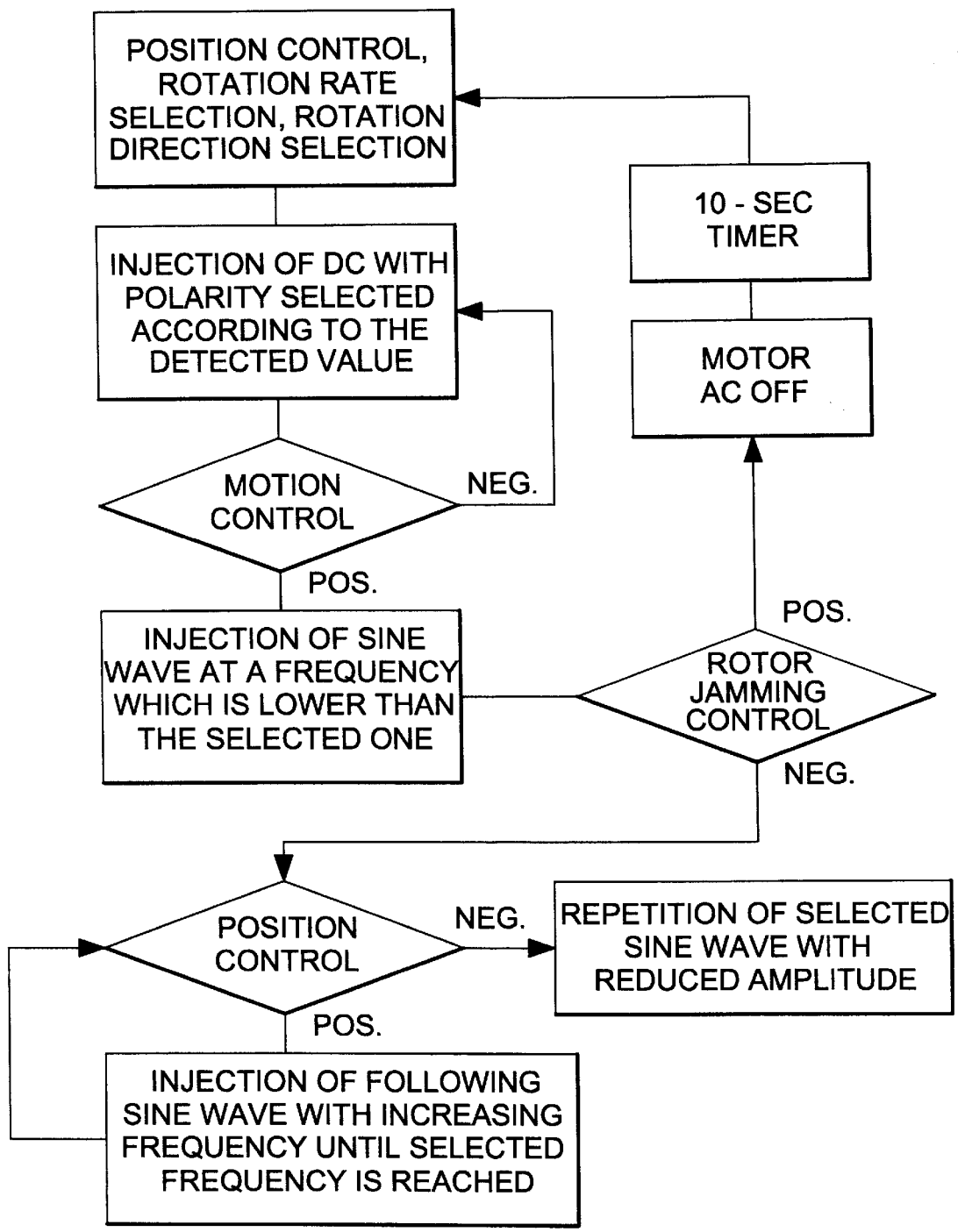

With particular reference to the flowchart of FIG. 5, there is a first process which relates to position control, with rotation rate and direction selection. Then a DC current, the polarity whereof is selected according to the measured value, is injected. Then, depending on the result of the motion control, a sine wave having a lower frequency than the selected one is injected or the injection of DC current of the previous step is repeated.

The step for the injection of a sine wave at a frequency which is lower than the selected one is followed by a motor jamming control action; in case of jamming, the motor is powered down and a timer is started which keeps the motor in this configuration for a preset time (for example 10 seconds, as in the illustrated chart); if jamming has not occurred, position control is performed. If position control yields a negative result, the selected sine wave is repeated with a reduced amplitude; if the result of the control is positive, a subsequent sine wave is instead injected, its frequency rising until the selected frequency is reached.

In other words, a device provided according to the present invention uses a microcontroller 7 which is programmable (i.e., wherein dedicated resident software is provided) combined with a rotor position sensor 5. The microcontroller 7 is capable of modulating the AC mains voltage by applying DC components so as to correct the magnetic alignment of the rotor 4, allowing it to start in the preferred direction. The stator winding is powered by means of at least one solid-state switch, which is series-connected to the mains voltage and is driven directly by the microcontroller 7. As an alternative, it is possible to provide components of the TRIAC type 10 or of the MOSFET type 11 or of other types (for example of the IGBT type or bipolar transistors) at the rotor 4.

The present device (and the corresponding method) allows to increase the torque while the synchronous rotation rate is being reached by means of adapted wave trains of adequate polarity applied to the stator winding and superimposed on the mains AC voltage.

The stator winding 2 can be supplied with a DC voltage which is appropriately modulated by means of single-pole solid-state switches which can regulate the starting rotation direction as well as the torque and synchronous rate values of the synchronous motor.

In order to detect the position of the rotor 4, it is possible to use, as also mentioned earlier, two position sensors which are arranged so that they can precisely determine the position of the rotor even in case of momentary jamming during rotation at the synchronous rate; this particularity is useful for correctly restarting rotation in the same direction by means of appropriate DC components superimposed on the AC supply voltage.

It is also possible to limit the maximum current absorbed by the stator 4 during the startup procedure or during rotation at non-synchronous rates by means of an appropriate modulation of the duty cycle of the applied wave, so as to protect the stator winding 2 from overloads.

Figure 7:
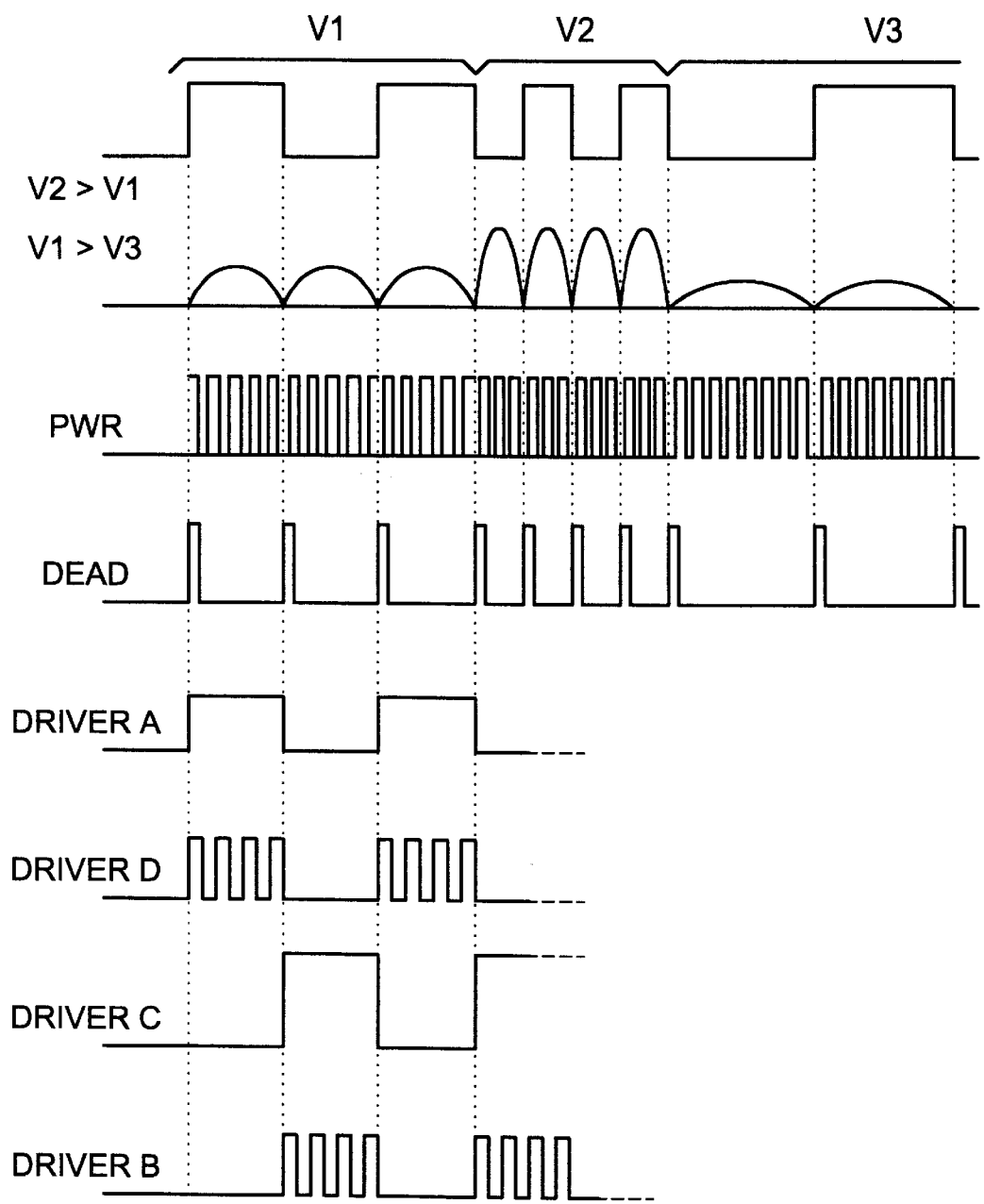

With reference to the example of FIGS. 6 and 7, there are provided four components of the MOSFET type, designated by the reference numeral 11 in the main drawing, which are controlled by the μcontroller 7 through a corresponding driver logic unit. Accordingly, there are provided four drivers, designated by the reference signs A, B, C, and D. FIG. 6 shows, in the circled details, possible alternatives to the MOSFETs, such as components of the transistor type 11' and of the IGBT type 11".

Between the drivers A, B, C, and D and the μcontroller 7, in the lower part of the drawing of FIG. 6, there is provided a block 7' which represents the component that supports the driver logic unit.

The reference numeral 71 designates the current feedback connection between the circuit of the motor and the μcontroller 7; this control of the stator current allows to correct the induction curve and to protect the magnet of the motor.

The stator switches are preferably driven according to the waveforms illustrated in the accompanying diagram of FIG. 7, which shows the waveforms sent by the various drivers, and by the driver logic unit, as a function of the rotation rates of the motor.

The current values are not linked in a linear fashion to the rotation rates but they are linked by a particular curve which is stored in the EPROM of the µcontroller 7; in practice, dedicated software resides in the µcontroller 7 and includes a plurality of curves related to different operating conditions of possible motors to be controlled and actuated with the device according to the present invention.

In summary, the device according to the present invention allows full control of synchronous motors as regards the rotation direction, the torque, and the synchronous rate; these values can be adjusted independently and separately according to the applications, allowing the synchronous motor to have a wide range of applications which are currently not possible, maintaining the characteristics of simplicity, economy, and reliability which are typical of the technology of said motors.

The invention thus conceived is susceptible of numerous modifications and variations, regarding both its constructive characteristics and successions of steps related to flowcharts, all of which are within the scope of the same inventive concept. All the details may also be replaced with other technically equivalent elements.

What is claimed is:

1. A method for actuating and controlling permanent-magnet synchronous motors powered by alternating current supplied by a supply mains and comprising a permanent-magnet rotor and a stator which is provided with corresponding exciter windings, comprising, for the power supply of said stator, the modulation of the alternating mains voltage by applying thereto, through single-pole solid-state switches driven by microprocessor means, a DC component so as to correct the magnetic alignment of said rotor, said switches being adapted to adjust on command the starting rotation direction as well as the torque and synchronous rate values of said motor, the method further comprising the steps of:
    a) controlling, through sensor means which are arranged at said rotor and act thereat, the position of said rotor;
    b) injecting an asymmetric component which corresponds to the chosen rotation direction;
    c) controlling the motion of the rotor, moving on to the following step in case of a positive result and returning to step b) in case of a negative result;
    d) injecting a successive half-wave which corresponds to the rotation direction.

2. The method for actuating and controlling electric motors according to claim 1, further comprising the steps of:
    detecting the phase shift of said rotor with respect to the mains frequency during the acceleration of the motor whereby said motor reaches the synchronous rate;
    supplying, as a function of the detected phase shift, a plurality of asymmetric waves or wave trains of preset polarity to said windings of said stator, using microprocessor means which are provided with, or connected to, switch means so as to preset the chosen rotation direction before power-on.

3. A method for actuating and controlling electric motors according to claim 1, further comprising the steps of:
    a) controlling the position of said rotor and selecting the rotation rate and direction;
    b) injecting a DC component having a polarity which is selected according to the value detected during the control of the previous step;
    c) controlling the motion of the rotor, moving on to the following step in case of a positive result and returning to step b) in case of a negative result;
    d) injecting a sine wave at a frequency which is lower than the one selected in step a);
    e) verifying the operation of said rotor, controlling any jamming thereof, moving on to the following step f) if jamming has occurred and moving on to step g) if jamming has not occurred;
    f) performing a shutdown of said motor for a preset period, subsequently moving on to step a);
    g) controlling the position of the roto, i.e., controlling that the intended position has been reached, moving on to the subsequent step if the position is correct and repeating the injection of the selected sine wave with reduced amplitude in case of incorrect position;
    h) injecting a subsequent sine wave of increasing frequency until the selected frequency is reached.

4. The method for actuating and controlling electric motors according to claim 1, wherein the torque is increased while the synchronous rate is being reached by means of appropriate wave trains of adequate polarity, which are applied to the stator winding and are superimposed on the AC mains voltage.

5. The method for actuating and controlling electric motors according to claim 1, wherein it uses two sensors for the position of the rotor which are arranged so as to allow to determine the position of said rotor even in case of momentary jamming during rotation at the synchronous rate, so as to be able to correctly restart rotation in the same direction by means of appropriate DC components superimposed on the AC supply voltage.

6. The method for actuating and controlling electric motors according to claim 1, wherein it provides for limiting the maximum current absorbed by the stator during the startup procedure and/or during rotation at non-synchronous rates, by means of an appropriate modulation of the duty cycle of the applied wave, so as to protect the stator winding against overloads.

7. The method for actuating and controlling electric motors according to claim 1, wherein said microprocessor means contain dedicated software adapted to automatically select a curve which can be used in supplying power to said stator according to the operating conditions of the motor.

* * * * *